(12) United States Patent
Burakovsky et al.

(10) Patent No.: US 12,464,359 B2
(45) Date of Patent: Nov. 4, 2025

(54) PERFORMING 5G LAN SECURITY BASED ON 5G LAN RELATED

(71) Applicant: Palo Alto Networks, Inc., Santa Clara, CA (US)

(72) Inventors: Leonid Burakovsky, Pleasanton, CA (US); Sachin Verma, Danville, CA (US); Sree Koratala, Dallas, TX (US)

(73) Assignee: Palo Alto Networks, Inc., Santa Clara, CA (US)

( * ) Notice: Subject to any disclaimer, the term of this patent is extended or adjusted under 35 U.S.C. 154(b) by 406 days.

(21) Appl. No.: 17/852,062

(22) Filed: Jun. 28, 2022

(65) Prior Publication Data
US 2023/0422040 A1 Dec. 28, 2023

(51) Int. Cl.
*H04W 12/37* (2021.01)
*H04W 12/121* (2021.01)
*H04W 24/10* (2009.01)

(52) U.S. Cl.
CPC ......... *H04W 12/37* (2021.01); *H04W 12/121* (2021.01); *H04W 24/10* (2013.01)

(58) Field of Classification Search
None
See application file for complete search history.

(56) References Cited

U.S. PATENT DOCUMENTS

| | | | |
|---|---|---|---|
| 2018/0234459 A1* | 8/2018 | Kung | H04L 63/0263 |
| 2019/0109823 A1* | 4/2019 | Qiao | H04M 15/8016 |
| 2020/0106812 A1* | 4/2020 | Verma | H04W 12/088 |
| 2020/0128399 A1* | 4/2020 | Verma | H04W 12/73 |

OTHER PUBLICATIONS

ETSI, ETSI TS 129 518 V16.8.0 (Aug. 2021), 5G; 5G System; Access and Mobility Management Services; Stage 3, (3GPP TS 29.518 version 16.8.0 Release 16).
ETSI, ETSI TS 129 522 V17.5.0, (Mar. 2022), 5G; 5G System; Network Exposure Function Northbound APIs; Stage 3, (3GPP TS 29.522 version 17.5.0 Release 17).

* cited by examiner

*Primary Examiner* — William J. Goodchild
(74) *Attorney, Agent, or Firm* — Van Pelt, Yi & James LLP

(57) ABSTRACT

Techniques for 5G LAN security in mobile networks are disclosed. In some embodiments, a system/process/computer program product for 5G LAN security in mobile networks includes monitoring network traffic on a mobile network at a security platform to identify a new session; extracting a plurality of 5G LAN related parameters using an application programming interface (API) at the security platform; and enforcing a security policy on the new session at the security platform based on one or more of the plurality of 5G LAN related parameters to apply 5G LAN security in the mobile network.

22 Claims, 13 Drawing Sheets

| Attribute name | Data type | P | Description |
|---|---|---|---|
| exterGroupId | ExternalGroupId | M | Identifies a 5G Virtual Network Group |
| gpsis | map(Gpsi) | M | Represents the list of 5G VN Group members, each member is identified by GPSI |
| dnn | Dnn | M | DNN for the 5G VN group, a full DNN with both the Network Identifier and Operator Identifier, or a DNN with the Network Identifier only. |
| snssai | Snssai | M | S-NSSAI for the 5G VN group |

FIG. 2A

| Attribute name | Data type | P | Description |
|---|---|---|---|
| exterGroupId | ExternalGroupId | M | Identifies a 5G Virtual Network Group |
| gpsis | map(Gpsi) | M | Represents the list of 5G VN Group members, each member is identified by GPSI |
| dnn | Dnn | M | DNN for the 5G VN group, a full DNN with both the Network Identifier and Operator Identifier, or a DNN with the Network Identifier only. |
| snssai | Snssai | M | S-NSSAI for the 5G VN group |

FIG. 2B

| Attribute name | Data type | P | Description |
|---|---|---|---|
| aaaIpv4Addr | Ipv4Addr | O | Identifies the DN-AAA server IPv4 address provided by AF, for the secondary authentication/authorization and/or UE IP address allocation by DN-AAA server. |
| aaaIpv6Addr | Ipv6Addr | O | Identifies the DN-AAA server IPv6 address provided by AF, for the secondary authentication/authorization and/or UE IP address allocation by DN-AAA server. |
| aaUsgs | array(AaaUsage) | O | Identifies the usage needs for secondary authentication/authorization and/or UE IP address allocation from the DN-AAA server. |
| mtcProviderId | MtcProviderInformation | O | Indicates MTC provider information for 5G VN Group Configuration authorization. |
| sessionTypes | array(PduSessionType) | O | If further PDU Session Types (in addition to the PDU Session Type indicated in the "sessionType" attribute) are allowed for the 5G VN group, they are provided in this attribute. |

FIG. 2C

| Attribute name | Data type | P | Description |
|---|---|---|---|
| exterGroupId | ExternalGroupId | O | Represents a group of users. For example a 5G Virtual Network Group (NOTE 1) |
| dnn | Dnn | O | Identifies a DNN (NOTE 2) (NOTE 3) |
| snssai | Snssai | O | Identifies an S-NSSAI (NOTE 2) (NOTE 3) |
| gpsi | Gpsi | O | Identifies GPSI (NOTE 1) |
| ueIpv4 | Ipv4Addr | O | The Ipv4 address of the served UE (NOTE 1) |
| ueIpv6 | Ipv6Addr | O | The Ipv6 address of the served UE (NOTE 1) |
| ueMac | MacAddr48 | O | The MAC address of the served UE (NOTE 1) |

FIG. 2D

| Attribute name | Data type | P | Description |
|---|---|---|---|
| self | Link | O | Identifies the individual service parameter subscription resource URI. Shall be present by the NEF in HTTP responses that include an object of ServiceParameterData type. |
| afServiceId | string | O | Identifies a service on behalf of which the AF is issuing the request. (NOTE 2) (NOTE 3) |
| appId | string | O | Identifies an application identifier (NOTE 2) |
| anyUeInd | boolean | O | Identifies whether the service parameters apply to any UE. This attribute shall set to "true" if applicable for any UE, otherwise, set to "false". (NOTE 1) (NOTE 3) |
| subNotifEvents | array(Event) | O | Identifies the AF subscribed event(s) notifications related to AF provisioned service parameters. |
| notificationDestination | Uri | C | Contains the callback URI to receive the notifications from the NEF. Shall be present if "subNotifEvents" attribute is included. |

FIG. 2E

| Attribute name | Data type | P | Description |
|---|---|---|---|
| requestTestNotification | boolean | O | Set to true by the AF to request the NEF to send a test notification as defined in subclause 5.2.5.3 of 3GPP TS 29.122. Set to false or omitted otherwise. |
| websockNotifConfig | WebsockNotifConfig | O | Configuration parameters to set up notification delivery over Websocket protocol. |
| paramOverPc5 | ParameterOverPc5 | O | Contains the V2X service parameters used over PC5 |
| paramOverUu | ParameterOverUu | O | Contains the V2X service parameters used over Uu |
| paramForProSeDd | ParamForProSeDd | O | Contains the service parameters for 5G ProSe direct discovery. |
| paramForProSeDc | ParamForProSeDc | C | Contains the service parameters for 5G ProSe direct communications. |

FIG. 2F

| Attribute name | Data type | P | Description |
|---|---|---|---|
| paramForProSeU2NRelUe | ParamForProSeU2NRelUe | O | Contains the service parameters for 5G ProSe UE-to-network relay UE. |
| paramForProSeRemUe | ParamForProSeRemUe | O | Contains the service parameters for 5G ProSe remote UE. |
| urspGuidance | array(UrspRuleRequest) | O | Contains the service parameter used to guide the URSP. |
| mtcProviderId | MtcProviderInformation | O | Indicates MTC provider information. |
| suppFeat | SupportedFeatures | C | Indicates the list of Supported features used as described in subclause 5.11.3. This attribute shall be provided in the POST request and in the response of successful resource creation. |

FIG. 2G

PERFORMING 5G LAN SECURITY BASED ON 5G LAN RELATED

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 2A-2G are tables that illustrate example 5GLAN-Parameters in accordance with some embodiments.

DETAILED DESCRIPTION

Figure 1A:
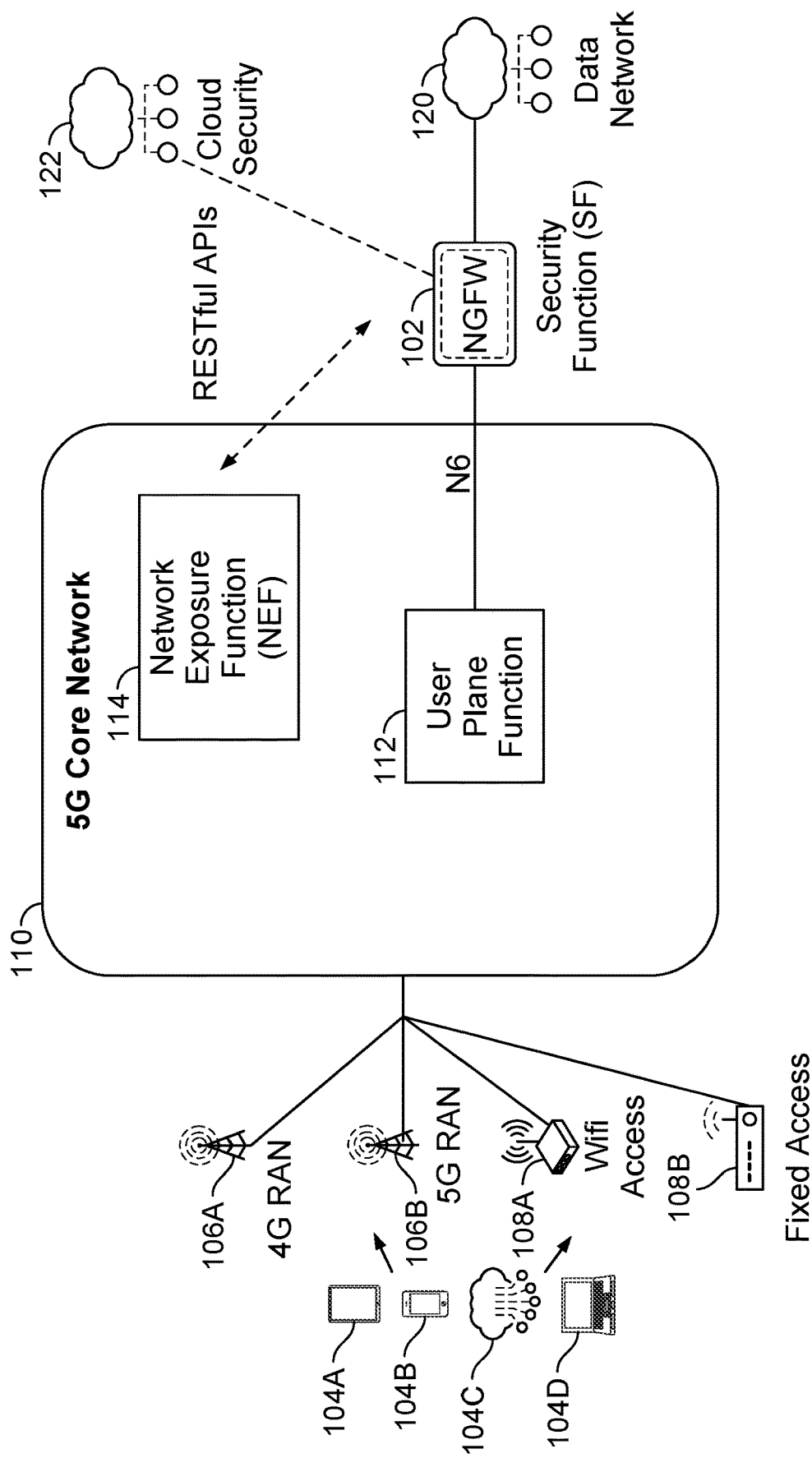
FIG. 1A is a block diagram of an architecture of a 5G wireless network with a security platform for 5G LAN security in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for 5G LAN Security in Mobile Networks

Generally, 5G expands the scope and reach of 3GPP-defined technologies. There are multiple market segments in the realm of residential, office, enterprise, and factory, where 5G will need to provide services with similar functionalities to Local Area Networks (LANs). This creates an opportunity to secure various 5G LAN-type services that, for example, will be provided to user equipment devices (UEs) that are connected to 5G networks.

However, technical and security challenges with service provider networks exist for devices in mobile networks including for securing various 5G LAN-type services that will be provided to UEs connected to 5G mobile networks.

As such, what are needed are new and improved security techniques for devices in such service provider network environments (e.g., mobile networks, including 5G networks). Specifically, what are needed are new and improved solutions for monitoring such network traffic and applying context-based security policies (e.g., firewall policies) for devices communicating on service provider networks, including for securing 5G LAN-type services and/or 5G LAN security.

In some embodiments, a system/process/computer program product for 5G LAN security in mobile networks includes monitoring network traffic on a mobile network at a security platform to identify a new session; extracting a plurality of 5G LAN related parameters using an application programming interface (API) at the security platform; and enforcing a security policy on the new session at the security platform based on one or more of the plurality of 5G LAN related parameters to apply 5G LAN security in the mobile network.

For example, the disclosed techniques for 5G LAN security in mobile networks can also include using RESTful Application Programming Interfaces (APIs) and/or over various 5G LAN related interfaces (e.g., including N3 and N6 interfaces) in mobile networks, such as will be further described below.

In one embodiment, a system/process/computer program product for 5G LAN security in mobile networks further includes performing 5G LAN level threat identification and prevention in 5G networks.

In one embodiment, a system/process/computer program product for 5G LAN security in mobile networks further includes performing 5G LAN level application identification and control in 5G networks.

In one embodiment, a system/process/computer program product for 5G LAN security in mobile networks further includes performing 5G LAN level URL filtering in 5G networks.

In one embodiment, a system/process/computer program product for 5G LAN security in mobile networks further includes performing RESTful API-based context information collection for security enforcement in 5G network.

In one embodiment, a system/process/computer program product for 5G LAN security in mobile networks further includes performing security enforcement in a deployment environment using one or more 5G 3GPP mobility interfaces, wherein the one or more 5G 3GPP mobility interfaces include using an N3 interface and an N11 interface to inspect and extract contextual information for security enforcement in the deployment environment.

For example, the disclosed techniques for securing 5G LAN-type services can be performed using a security platform deployed in a 5G technology-based mobile network. The security platform can be configured for 5G LAN-virtual network parameters awareness by using a 5GLANParameterProvision API sent to a Network Exposure Function (NEF). The 5GLANParameterProvision API is defined in 3GPP TS 29.522-v17.5.0 Network Exposure Function Northbound APIs (e.g., this technical specification is publicly available at www.etsi.org), such as will be further described below with respect to various embodiments.

As such, mobile network operators can use the disclosed techniques for 5G LAN security to secure 5G LAN-type services in their mobile networks using such a security platform (e.g., security platforms can also be configured to distinct deployment/operating environments for performing such 5G LAN-type services, including office deployment/operating environments, enterprise deployment/operating environments, and factory deployment/operating environments, in which 5G technology is used to provide services with similar functionalities to Local Area Networks (LANs)), such as will be further described below.

As such, the disclosed techniques facilitate enhanced security for 5G LAN security in mobile networks. For example, security functions (e.g., security platforms) can be located closer to the user/device (e.g., UE) for performing security policy analysis and enforcement. As another example, security functions can be implemented to facilitate security for selective industry verticals. As yet another example, security can be implemented in highly sensitive locations, such as government network environments, military network environments, and power plant or other critical infrastructure network environments.

Accordingly, new and improved security solutions that facilitate applying security (e.g., network-based security) using a security platform for performing the disclosed techniques for 5G LAN security (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) in a mobile network (e.g., a 4G/5G/6G/later versions of mobile networks) on various interfaces and protocols in mobile network environments are disclosed in accordance with some embodiments.

These and other embodiments and examples for 5G LAN security in mobile networks will be further described below.

Example System Architectures for 5G LAN Security in Mobile Networks

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over various interfaces (e.g., RESTful APIs; N3, N6, and/or other interfaces in a 5G core network) to apply security on user plane traffic based on a policy (e.g., layer-7 security and/or other security policy enforcement) as further described below.

FIG. 1A is a block diagram of an architecture of a 5G wireless network with a security platform for 5G LAN security in mobile networks in accordance with some embodiments. Specifically, FIG. 1A is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying 5G LAN security over various interfaces (e.g., RESTful APIs; N3, N6, and/or other interfaces in a 5G core network) in mobile networks (e.g., 5G or later mobile networks) as further described below.

As shown in FIG. 1A, the 5G mobile network environment can also include 4G Radio Access Network (RAN) access and 5G Radio Access Network (RAN) access as shown at 106A and 106B, respectively, and/or other networks including, for example, Wi-Fi access and Fixed access as shown at 108A and 108B, respectively, to facilitate data communications for subscribers (e.g., using User Equipment (UE), such as smart phones, laptops, computers (which may be in a fixed location), and/or other cellular enabled computing devices/equipment, such as IoT devices as shown at 104A, 104B, 104C, and 104D, or other network communication enabled devices) including over a Central Data Network (e.g., the Internet) 120 to access various applications, web services, content hosts, etc. and/or other networks. Each of the above-described 5G network access mechanisms are in communication with a 5G Core Network 110 that includes a 5G Mobile Core User Plane (UP) Function 112 and a Network Exposure Function (NEF) 114. 5G Mobile Core User Plane (UP) Function 112 is in communication with a Central Data Network 120 via an N6 interface in which Security Platform 102 is located inline between UP Function 112 and Data Network 120. Security Platform 102 is also in communication with NEF 114 via RESTful APIs as will be further described below.

Referring to FIG. 1A, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., RESTful APIs; N3, N6, and/or other interfaces in a 5G core network) in mobile networks as similarly described above and as further described below.

In this example implementation, the disclosed techniques for securing 5G LAN-type services can be performed using a security platform deployed in a 5G technology-based mobile network. The security platform can be configured for 5G LAN-virtual network parameters awareness by using a 5GLANParameterProvision API sent to NEF 114. The 5GLANParameterProvision API is defined in 3GPP TS 29.522-v17.5.0 Network Exposure Function Northbound APIs (e.g., this technical specification is publicly available at www.etsi.org), such as will be further described below with respect to various embodiments.

Specifically, in this example implementation, the 5GLAN parameters can be obtained using the following four options.

As a first option, the 5GLAN parameters can be obtained using the following resource URI: {apiRoot}/3gpp-5glan-pp/v1/{afId}/subscriptions. A security function (SF) can use this resource to read all active 5GLAN parameters provision subscriptions for the given application function (AF) (e.g., afid—Identifier of the AF). The GET method allows for reading all active subscriptions for a given AF. The SF shall initiate the HTTP GET request message and the NEF shall respond to the message.

As a second option, the 5GLAN parameters can be obtained using the following resource URI: {apiRoot}/3gpp-5glan-pp/v1/{afId}/subscriptions/{subscriptionId}. A security function (SF) will use this resource to read an existing 5GLAN parameters provision subscription for a given AF (e.g., afId—Identifier of the AF; and subscriptionId—Identifier of the subscription resource). The GET method allows for reading the active subscription for a given AF and subscription Id. The SF shall initiate the HTTP GET request message and the NEF shall respond to the message.

As a third option, the 5GLAN parameters can be obtained using the following resource URI: {apiRoot}/3gpp-service-parameter/v1/{afId}/subscriptions. A security function (SF) will use this resource to read all active 5GLAN parameters provision subscriptions for the given application function (AF) (e.g., afid—Identifier of the AF). The GET method allows to read all active subscriptions for a given AF. The SF shall initiate the HTTP GET request message, and the NEF shall respond to the message.

As a fourth option, the 5GLAN parameters can be obtained using the following resource URI: {apiRoot}/3gpp-service-parameter/v1/{afId}/subscriptions/{subscriptionId}. A security function (SF) will use this resource to read an existing 5GLAN parameters provision subscription for a given AF (e.g., afid—Identifier of the AF, and subscriptionId—Identifier of the subscription resource). The GET method allows to read the active subscription for a given AF and subscription Id. The SF shall initiate the HTTP GET request message and the NEF shall respond to the message.

In some embodiments, a security platform is further configured to provide the following DPI capabilities: DPI of IP traffic over the N6 interface. In an example implementation, the security platform is configured to provide DPI capabilities (e.g., including to identify an APP ID, a user ID, a content ID, perform URL filtering,) of, for example, IP sessions over N6 interfaces between UP Function 112 and Data Network 120 to apply security on user plane traffic based on a policy (e.g., layer-7 security and/or other security policy enforcement) as further described below.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Figure 1B:
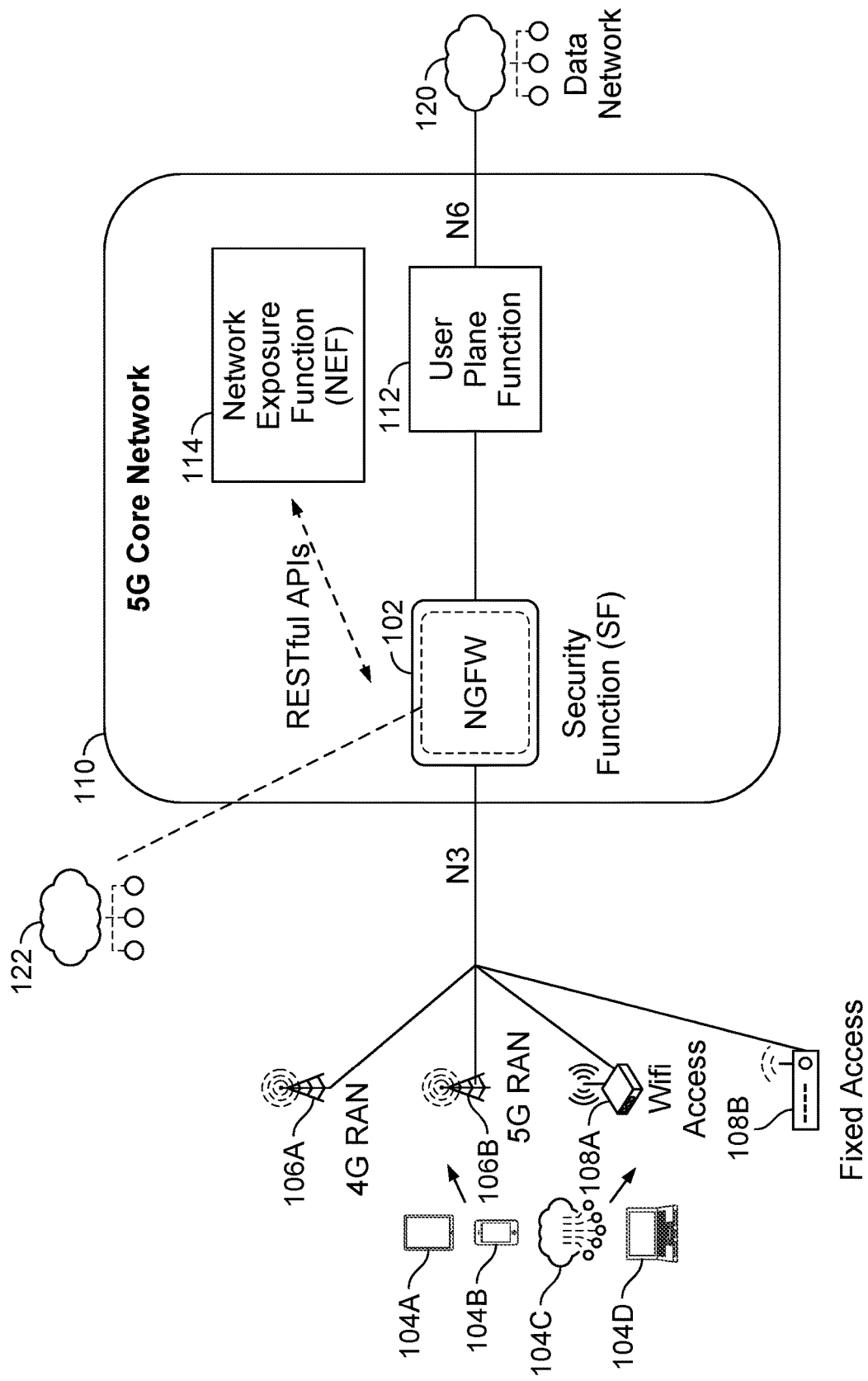
FIG. 1B is another block diagram of an architecture of a 5G wireless network with a security platform for 5G LAN security in mobile networks in accordance with some embodiments.

FIG. 1B is another block diagram of an architecture of a 5G wireless network with a security platform for 5G LAN security in mobile networks in accordance with some embodiments. Specifically, FIG. 1B is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying 5G LAN security over various interfaces (e.g., RESTful APIs; N3, N6, and/or other interfaces in a 5G core network) in mobile networks (e.g., 5G or later mobile networks) as further described below.

As shown in FIG. 1B, the 5G mobile network environment can also include 4G Radio Access Network (RAN) access and 5G Radio Access Network (RAN) access as shown at 106A and 106B, respectively, and/or other networks including, for example, Wi-Fi access and Fixed access as shown at 108A and 108B, respectively, to facilitate data communications for subscribers (e.g., using User Equipment (UE), such as smart phones, laptops, computers (which may be in a fixed location), and/or other cellular enabled computing devices/equipment, such as IoT devices as shown at 104A, 104B, 104C, and 104D, or other network communication enabled devices) including over a Central Data Network (e.g., the Internet) 120 to access various applications, web services, content hosts, etc. and/or other networks. Each of the above-described 5G network access mechanisms are in communication with a 5G Core Network 110 that includes a 5G Mobile Core User Plane (UP) Function 112 and a Network Exposure Function (NEF) 114. 5G Mobile Core User Plane (UP) Function 112 is in communication with a Central Data Network 120 via an N6 interface.

In this example implementation, Security Platform 102 is located in 5G Core Network 110 and inline before UP Function 112. Security Platform 102 is also in communication with NEF 114 via RESTful APIs as similarly described above with respect to FIG. 1A.

Referring to FIG. 1B, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying context-based security over various interfaces (e.g., RESTful APIs; N3, N6, and/or other interfaces in a 5G core network) in mobile networks as similarly described above and as further described below.

In some embodiments, a security platform is further configured to provide the following DPI capabilities: DPI of IP traffic inside GTP-U tunnels over the N3 interface. In an example implementation, the security platform is configured to provide DPI capabilities (e.g., including to identify an APP ID, a user ID, a content ID, perform URL filtering,) of, for example, GTP-U sessions (e.g., GTP-U traffic) over N3 interfaces for traffic sent to UP Function 112 to apply security on user plane traffic based on a policy (e.g., layer-7 security and/or other security policy enforcement) as further described below In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

FIGS. 2A-2G are tables that illustrate example 5GLAN-Parameters in accordance with some embodiments.

Specifically, 5GLanParameters is the data type which represents the 5G LAN service related parameters, which can be obtained using one or more of the above-described four options. The tables shown in FIGS. 2A, 2B, and 2C provide the data types defined for these example 5GLanParameters.

The ServiceParameterData is the data type that contains 5G LAN service related parameters. The tables shown in FIGS. 2D, 2E, 2F, and 2G provide the data types defined for the example ServiceParameterData.

One of individual UE identifier (i.e., "gpsi", "ueIpv4", "ueIpv6", or "ueMac" attribute), External Group Identifier (i.e., "exterGroupId" attribute) or any UE indication (i.e., "anyUeInd" attribute) shall be included. For V2X and URSP service parameter provisioning (see clause 4.4.20), only "anyUeInd", "gpsi", and "exterGroupId" attributes are applicable.

Either the "afServiceId" attribute, "appId" attribute, or the combination of "snssai" and "dnn" attributes shall be provided. When the feature "AfGuideURSP" is supported, only the "afServiceId" attribute shall be provided for providing guidance for URSP determination.

When "anyUeInd" attribute is present, "appId" attribute, "afServiceId" attribute, or the combination of "snssai" attribute and "dnn" attribute shall be provided. When the feature "AfGuideURSP" is supported, only the "afServiceId" attribute shall be provided for providing guidance for URSP determination.

As will now be apparent, network traffic communications can be monitored/filtered using one or more security platforms for network traffic communications in various locations within the 5G network (e.g., 5G network or converged 5G network) to facilitate 5G LAN security in mobile networks.

Example Use Cases of Enhanced Security for 5G LAN Security in Mobile Networks

The disclosed techniques for providing enhanced security for mobile/service provider networks using a security platform for security policy enforcement, including for 5G LAN security in mobile networks, can be applied in a variety of additional example use case scenarios for facilitating enhanced security for 5G LAN environments in mobile networks (e.g., 4G/5G/6G and later mobile networks) as will now be described with respect to various example use cases.

As a first example use case, the disclosed techniques can be used to facilitate 5G LAN security in mobile networks (e.g., including context-based security over various interfaces in 5G networks, such as similarly described above with respect to various embodiments) and specifically to facilitate investigation of a security event related to UEs serviced by a 5G LAN-virtual network.

As a second example use case, the disclosed techniques can be used to facilitate 5G LAN security in mobile networks (e.g., including context-based security over various interfaces in 5G networks, such as similarly described above with respect to various embodiments) and specifically to apply security between UEs serviced by two distinct 5G LAN-virtual networks.

As a third example use case, the disclosed techniques can be used to facilitate 5G LAN security in mobile networks (e.g., including context-based security over various interfaces in 5G networks, such as similarly described above with respect to various embodiments) and specifically to allow trusted applications access to UEs of 5G LAN-virtual networks for, for example, an IoT group of an enterprise (e.g., and to, for example, apply known threat prevention).

The following is a list of example vulnerabilities that can be protected against for an IoT group of an enterprise using the above-described third example use case using the disclosed techniques: (1) Vivotek Network Camera Remote Command Injection Vulnerability CVE-2017-9828; (2) Vivotek Network Camera Information Disclosure Vulnerability CVE-2017-9829; (3) Wireless IP Camera WIFICAM Remote Command Injection Vulnerability CVE-2017-18377; (4) Advantech WebAccess SCADA Stack-based Buffer Overflow Vulnerability CVE-2018-7499; (5) Schneider Electric U.Motion Builder Remote Code Execution Vulnerability CVE-2018-7841 CVE-2018-7765; and (6) Schneider Electric EVlink Charging Station Firmware Authentication Bypass Vulnerability CVE-2021-22707.

As a fourth example use case, the disclosed techniques can be used to facilitate 5G LAN security in mobile networks (e.g., including context-based security over various interfaces in 5G networks, such as similarly described above with respect to various embodiments) and specifically to allow trusted applications access between UEs of a 5G LAN-virtual network for, for example, a sales group of an enterprise and a 5G LAN-virtual network for, for example, a printer group of an enterprise (e.g., and to, for example, apply known and unknown threat prevention connections between these two distinct groups).

The following is a list of example vulnerabilities that can be protected against for a printer group of an enterprise using the above-described fourth example use case using the disclosed techniques: (1) RICOH SP 4510SF Printer HTML Injection Vulnerability; (2) IBM RICOH Printer HTML Injection Vulnerability; (3) IBM RICOH Infoprint 1532 Printer Cross-Site Scripting Vulnerability; and (4) Samba Printer Server spools Denial-of-Service Vulnerability (CVE-2018-1050).

As a fifth example use case, the disclosed techniques can be used to facilitate 5G LAN security in mobile networks (e.g., including context-based security over various interfaces in 5G networks, such as similarly described above with respect to various embodiments) and specifically to allow trusted URLs access to UEs of a 5G LAN-virtual network for, for example, a Research and Development (R&D) group of an enterprise.

As will now be apparent to one of ordinary skill in the art, the disclosed techniques for applying context-based security over interfaces in 5G LAN environments in mobile networks using a security platform for security policy enforcement can be applied in a variety of additional example use case scenarios to detect/prevent these and other types of attacks for facilitating enhanced security for 5G LAN environments in mobile networks.

Figure 3:
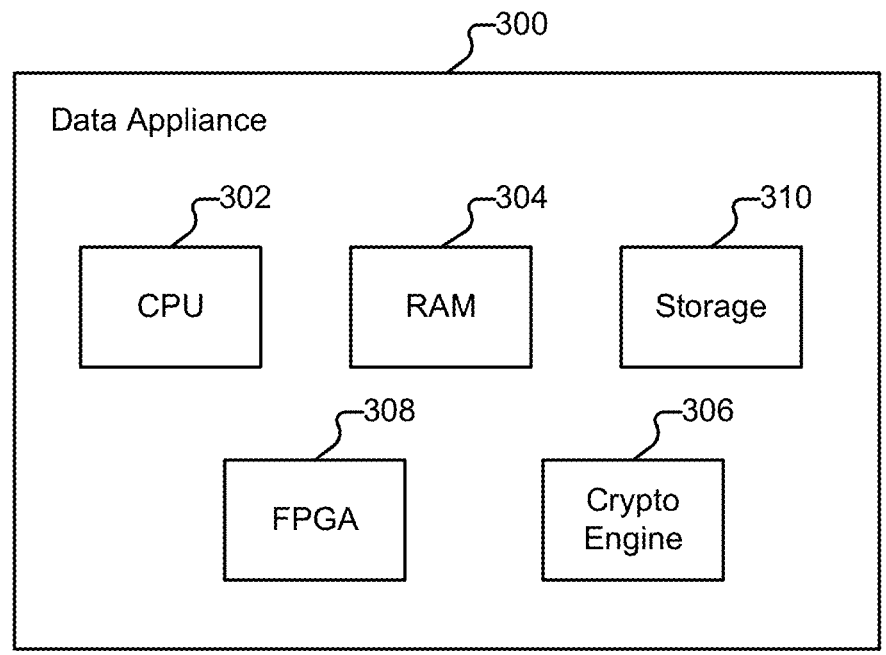
FIG. 3 is a functional diagram of hardware components of a network device for 5G LAN security in mobile networks in accordance with some embodiments.

Example Hardware Components of a Network Device for 5G LAN Security in Mobile Networks FIG. 3 is a functional diagram of hardware components of a network device for 5G LAN security in mobile networks in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores certain information (e.g., 5G LAN-type services related parameters) that is extracted from monitored traffic over various interfaces (e.g., RESTful APIs) that are monitored for implementing the disclosed security policy enforcement techniques for applying context-based security over various interfaces for 5G LAN related services in mobile networks using a security platform(s) as similarly described above with respect to FIGS. 1A-1B and 2A-2G. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
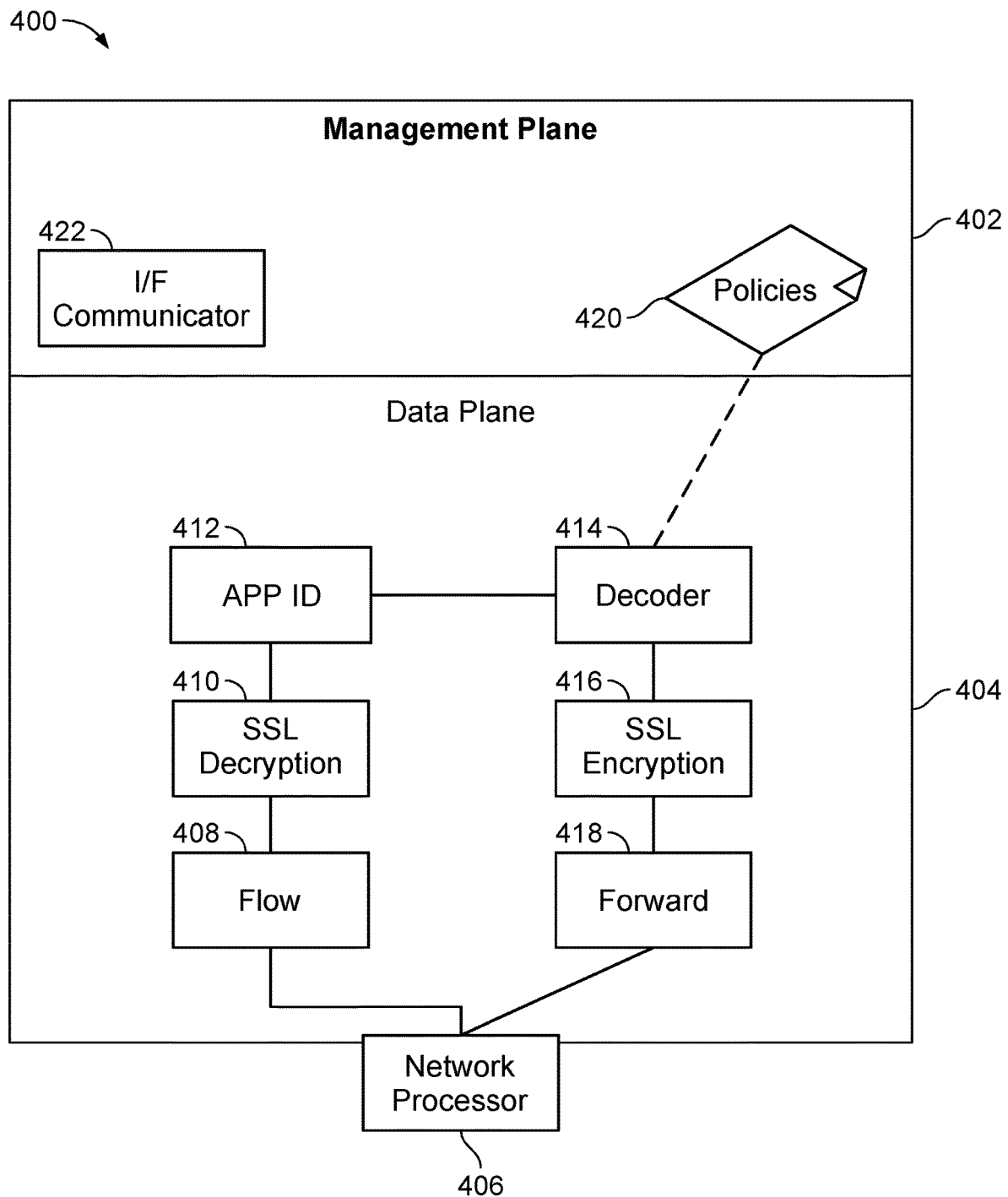
FIG. 4 is a functional diagram of logical components of a network device for 5G LAN security in mobile networks in accordance with some embodiments.

Example Logical Components of a Network Device for 5G LAN Security in Mobile Networks FIG. 4 is a functional diagram of logical components of a network device for 5G LAN security in mobile networks in accordance with some embodiments. The example shown is a representation of logical components that can be included in network device 400 (e.g., a data appliance, which can implement the disclosed security function/platform and perform the disclosed techniques for 5G LAN security in mobile networks). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, a MEC service, an IoT device, or another resource) using an encrypted session protocol, such as SSL. Network processor 406 is configured to monitor packets from the mobile device and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves (e.g., GTP-U traffic between various monitored interfaces as similarly described above with respect to FIGS. 1A and 1P traffic between various monitored interfaces as similarly described above with respect to FIG. 1B) and to identify a user associated with the traffic flow (e.g., to identify an Application-ID as described herein). For example, APP ID 412 can recognize a GET request in the received data and conclude that the session requires an HTTP decoder 414. As another example, APP ID 412 can recognize GTP-U session messages carrying encapsulated IP traffic from UEs (e.g., over various interfaces, such as similarly described above with respect to FIGS. 1A-1B) and conclude that the session requires a GTP-U decoder (e.g., to extract information exchanged in the GTP-U traffic session over various interfaces including various parameters, such as similarly described above with respect to FIGS. 1A-1B and FIGS. 2A-2G). For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information (e.g., such to extract various information exchanged in GTP-U traffic over various interfaces as similarly described above and further described below). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U traffic and/or DPI of monitored GTP-U and/or other protocol(s) traffic, such as N3/N6/other interfaces as similarly described above with respect to FIGS. 1A-1B) is applied as described herein with respect to various embodiments based on the monitored, decrypted, identified, and decoded session traffic flows.

As also shown in FIG. 4, an interface (I/F) communicator 422 is also provided for security platform manager communications (e.g., via (RESTful) APIs, including using the 5GLANParameterProvision API sent to the Network Exposure Function (NEF) in a 5G Core Network, as also similarly described above with respect to FIGS. 1A-1B and FIGS. 2A-2G; messages; or network protocol communications or other communication mechanisms). In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, reference point interfaces such as N3, N6, and/or other interfaces where wired and wireless network traffic flow exists). As such, network device 400 including I/F communicator 422 can be used to implement the disclosed techniques for 5G LAN security as described above and as will be further described below.

Additional example processes for the disclosed techniques for 5G LAN security in mobile networks will now be described.

Example Processes for 5G LAN Security in Mobile Networks

Figure 5:
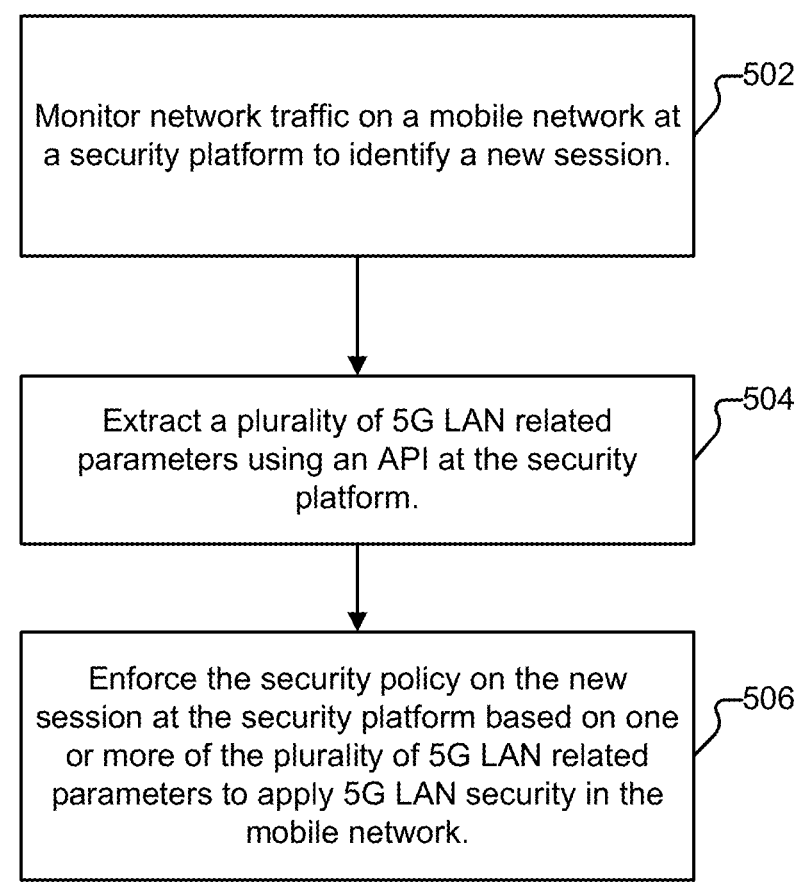
FIG. 5 is a flow diagram of a process for 5G LAN security in mobile networks in accordance with some embodiments.

FIG. 5 is a flow diagram of a process for 5G LAN security in mobile networks in accordance with some embodiments. In some embodiments, a process 500 as shown in FIG. 5 is performed by the security platform and techniques as similarly described above including the embodiments described above with respect to FIGS. 1A-4. In one embodiment, process 500 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 502, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over N3/N6 interfaces) and/or other protocols, on the mobile network and, more specifically, by performing the disclosed techniques can monitor various interfaces, such as the N3 and N6 interfaces, as similarly described above.

At 504, extracting a plurality of 5G LAN related parameters using an application programming interface (API) at the security platform is performed. For example, the parameters as similarly described above with respect to FIGS. 2A-2G can be extracted.

At 506, enforcing a security policy on the new session at the security platform based on one or more of the plurality of 5G LAN related parameters to apply 5G LAN security in the mobile network is performed. For example, security policy enforcement can include allowing or blocking the session.

Figure 6:
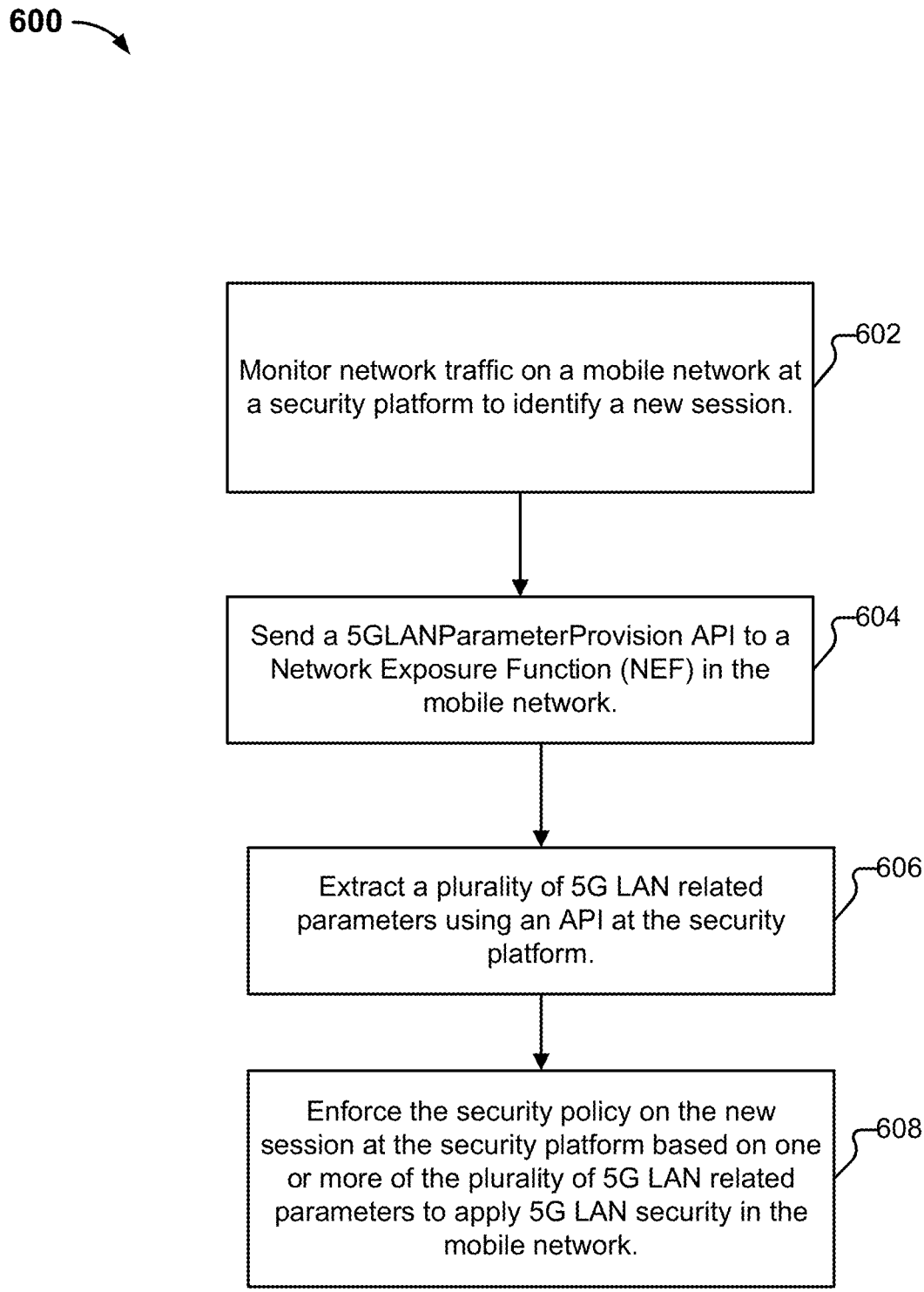
FIG. 6 is another flow diagram of a process for 5G LAN security in mobile networks in accordance with some embodiments.

FIG. 6 is another flow diagram of a process for 5G LAN security in mobile networks in accordance with some embodiments. In some embodiments, a process 600 as shown in FIG. 6 is performed by the security platform and techniques as similarly described above including the embodiments described above with respect to FIGS. 1A-4. In one embodiment, process 600 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network traffic on a mobile network at a security platform to identify a new session is performed. For example, the security platform (e.g., a firewall, a network sensor acting on behalf of the firewall, or another device/component that can implement security policies) can monitor, in some cases, various protocols, such as GTP-U (e.g., over N3/N6 interfaces) and/or other protocols, on the mobile network and, more specifically, by performing the disclosed techniques can monitor various interfaces, such as the N3 and N6 interfaces, as similarly described above.

At 604, sending a 5GLANParameterProvision API to a Network Exposure Function (NEF) in the mobile network is performed. For example, the security platform can be configured to use RESTful APIs, including the 5GLANParameterProvision API that can be sent to a Network Exposure Function (NEF) in the mobile network, to facilitate obtaining various 5G LAN related parameters, such as similarly described above with respect to FIGS. 1A-1B and FIGS. 2A-2G.

At 606, extracting a plurality of 5G LAN related parameters using an application programming interface (API) at the security platform is performed. For example, the parameters as similarly described above with respect to FIGS. 2A-2G can be extracted.

At 608, enforcing a security policy on the new session at the security platform based on one or more of the plurality of 5G LAN related parameters to apply 5G LAN security in the mobile network is performed. For example, security policy enforcement can include allowing or blocking the session.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   monitor network traffic on a mobile network at a security platform to identify a new session;
   extract a plurality of 5G LAN related parameters using an application programming interface (API) at the security platform, wherein the plurality of 5G LAN related parameters includes 5GLANparameters and ServiceParameterData, wherein the 5GLANparameters includes three or more of the following: "exterGroupId", "gpsis", "dnn", "snssai", "sessionType", "appDesps", "osid", "appids", "aaaipv4addr", "aaaipv6addr", "aaUsgs", "mtcProviderid", and/or "sessionTypes", wherein the ServiceParameterData includes one of the following: a combination of "dnn" and "snssai", "afServiceId", or "appId", and three or more of the following: "exterGroupId", "gpsis", "ueipv4", "ueipv6", "ueMac", "self", and/or "anyUeInd", and wherein the extracting of the plurality of 5G LAN related parameters comprises to:
   read the plurality of 5G LAN related parameters for an application function of the API and a subscription identifier, comprising to:
   determine that AfGuideURSP is supported; and
   in response to a determination that the AfGuideURSP is supported, determining that the ServiceParameterData includes "afServiceId"; and
   enforce a security policy on the new session at the security platform based on one or more of the plurality of 5G LAN related parameters to apply 5G LAN security in the mobile network, comprising to:
   determine that AfGuideURSP is supported; and
   in response to a determination that the AfGuideURSP is supported, determine that the ServiceParameterData includes only "afServiceId" for User Equipment Routing Selection Policy (URSP) determination; and
   a memory coupled to the processor and configured to provide the processor with instructions.

2. The system recited in claim 1, wherein the API includes a 5GLANParameterProvision API.

3. The system recited in claim 1, wherein the security platform is configured for 5G LAN-virtual network parameters awareness by using a 5GLANParameterProvision API sent to a Network Exposure Function (NEF).

4. The system recited in claim 1, wherein the security platform is configured with a plurality of security policies to apply the 5G LAN security in the mobile network.

5. The system recited in claim 1, wherein the processor is further configured to:
perform RESTful API-based context information collection for security enforcement in the mobile network.

6. The system recited in claim 1, wherein the processor is further configured to:
perform 5G LAN level threat identification in the mobile network.

7. The system recited in claim 1, wherein the processor is further configured to:
perform 5G LAN level threat identification and prevention in the mobile network.

8. The system recited in claim 1, wherein the processor is further configured to:
perform 5G LAN level application identification and control in the mobile network.

9. The system recited in claim 1, wherein the processor is further configured to:
perform 5G LAN level URL filtering in the mobile network.

10. The system recited in claim 1, wherein the processor is further configured to:
block the new session from accessing a resource based on the security policy.

11. The system recited in claim 1, wherein the processor is further configured to:
allow the new session to access a resource based on the security policy.

12. The system recited in claim 1, wherein the 5GLANparameters includes five or more of the following: "exterGroupId", "gpsis", "dnn", "snssai", "sessionType", "appDesps", "osid", "appids", "aaaipv4addr", "aaaipv6addr", "aaUsgs", "mtcProviderid", and/or "sessionTypes".

13. The system recited in claim 1, wherein the 5GLANparameters includes seven or more of the following: "exterGroupId", "gpsis", "dnn", "snssai", "sessionType", "appDesps", "osid", "appids", "aaaipv4addr", "aaaipv6addr", "aaUsgs", "mtcProviderid", and/or "sessionTypes".

14. A method, comprising:
monitoring network traffic on a mobile network at a security platform to identify a new session;
extracting a plurality of 5G LAN related parameters using an application programming interface (API) at the security platform, wherein the plurality of 5G LAN related parameters includes 5GLANparameters and ServiceParameterData, wherein the 5GLANparameters includes three or more of the following: "exterGroupId", "gpsis", "dnn", "snssai", "sessionType", "appDesps", "osid", "appids", "aaaipv4addr", "aaaipv6addr", "aaUsgs", "mtcProviderid", and/or "sessionTypes", wherein the ServiceParameterData includes one of the following: a combination of "dnn" and "snssai", "afServiceId", or "appId", and three or more of the following: "exterGroupId", "gpsis", "ueipv4", "ueipv6", "ueMac", "self", and/or "anyUeInd", and wherein the extracting of the plurality of 5G LAN related parameters comprises:
reading the plurality of 5G LAN related parameters for an application function of the API and a subscription identifier, comprising:
determining that AfGuideURSP is supported; and
in response to a determination that the AfGuideURSP is supported, determining that the ServiceParameterData includes "afServiceId"; and
enforcing a security policy on the new session at the security platform based on one or more of the plurality of 5G LAN related parameters to apply 5G LAN security in the mobile network.

15. The method of claim 14, wherein the API includes a 5GLANParameterProvision API.

16. The method of claim 14, wherein the security platform is configured for 5G LAN-virtual network parameters awareness by using a 5GLANParameterProvision API sent to a Network Exposure Function (NEF).

17. The method of claim 14, further comprising:
performing RESTful API-based context information collection for security enforcement in the mobile network.

18. The method of claim 14, further comprising:
performing 5G LAN level threat identification in the mobile network.

19. The method of claim 14, further comprising:
performing 5G LAN level threat identification and prevention in the mobile network.

20. The method of claim 14, further comprising:
blocking the new session from accessing a resource based on the security policy.

21. The method of claim 14, further comprising:
allowing the new session to access a resource based on the security policy.

22. A computer program product, the computer program product being embodied in a non-transitory computer readable storage medium and comprising computer instructions for:
monitoring network traffic on a mobile network at a security platform to identify a new session;
extracting a plurality of 5G LAN related parameters using an application programming interface (API) at the security platform, wherein the plurality of 5G LAN related parameters includes 5GLANparameters and ServiceParameterData, wherein the 5GLANparameters includes three or more of the following: "exterGroupId", "gpsis", "dnn", "snssai", "sessionType", "appDesps", "osid", "appids", "aaaipv4addr", "aaaipv6addr", "aaUsgs", "mtcProviderid", and/or "sessionTypes", wherein the ServiceParameterData includes one of the following: a combination of "dnn" and "snssai", "afServiceId", or "appId", and three or more of the following: "exterGroupId", "gpsis", "ueipv4", "ueipv6", "ueMac", "self", and/or "anyUeInd", and wherein the extracting of the plurality of 5G LAN related parameters comprises:
reading the plurality of 5G LAN related parameters for an application function of the API and a subscription identifier, comprising:
determining that AfGuideURSP is supported; and
in response to a determination that the AfGuideURSP is supported, determining that the ServiceParameterData includes "afServiceId"; and
enforcing a security policy on the new session at the security platform based on one or more of the plurality of 5G LAN related parameters to apply 5G LAN security in the mobile network.

* * * * *